H. M. MYERS.
Manufacture of Shovels.
No. 204,163. Patented May 28, 1878.
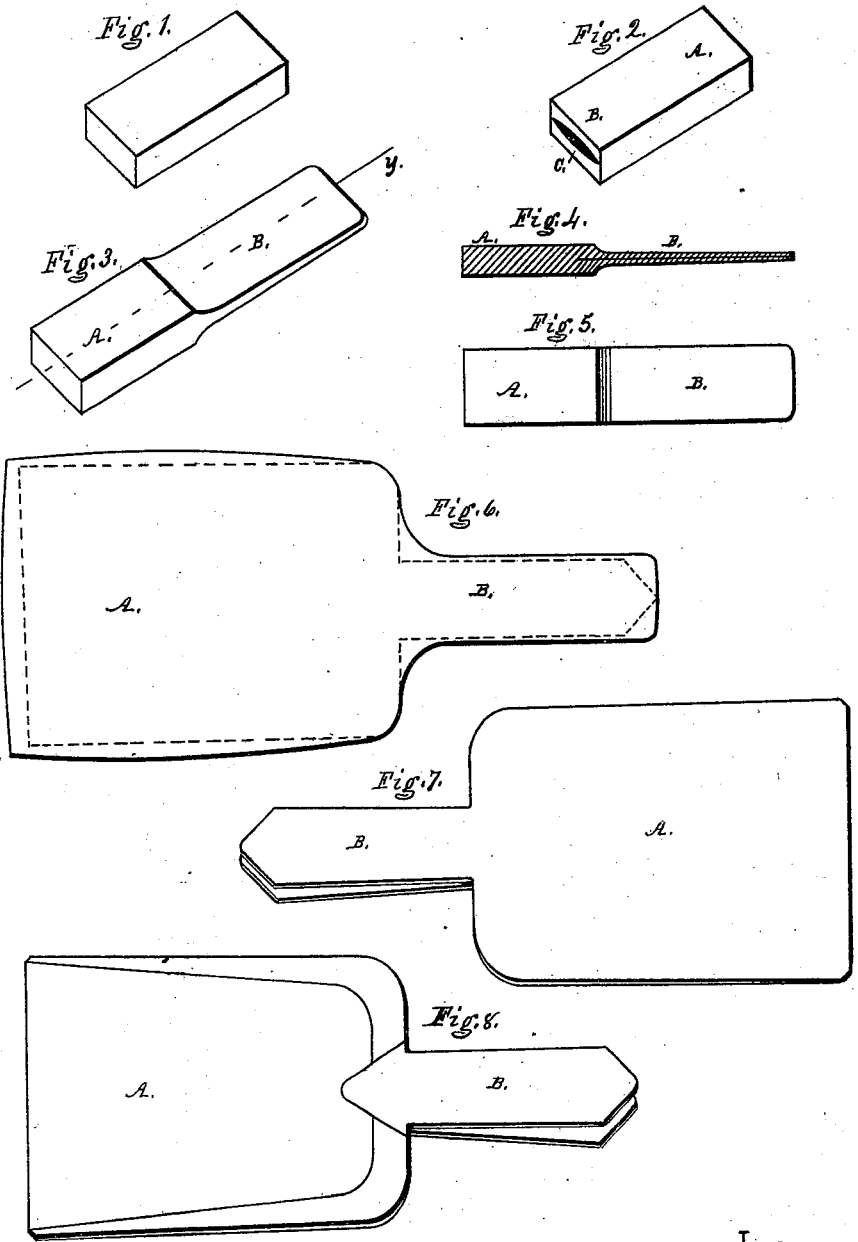
Witnesses
A. R. Johnston
A. S. W. Johnston
Inventor
Henry M. Myers.
By James J. Johnston,
his attorney.

UNITED STATES PATENT OFFICE.

HENRY M. MYERS, OF BEAVER FALLS, PENNSYLVANIA.

IMPROVEMENT IN THE MANUFACTURE OF SHOVELS.

Specification forming part of Letters Patent No. 204,163, dated May 28, 1878; application filed February 2, 1878.

*To all whom it may concern:*

Be it known that I, HENRY M. MYERS, of Beaver Falls, in the county of Beaver and State of Pennsylvania, have invented a certain new and useful Improvement in the Manufacture of Shovels; and I do hereby declare that the following is a full, clear, and exact description thereof, reference being had to the accompanying drawings, and to the letters of reference marked thereon.

This invention relates to an improvement upon Patent No. 61,756, granted to me February 5, 1867, for manufacture of shovels; and said improvement consists essentially in the method hereinafter described of forming the straps and socket for the handle.

To enable others skilled in the art with which my invention is most nearly connected to make and use it, I will proceed to describe its construction and operation.

In the accompanying drawings, which form part of my specification, Figure 1 is a perspective view of the blank after being cast or cut from a bar of steel or iron. Fig. 2 represents the blank after having a cavity punched in it, which cavity forms the socket for the handle and parting between the two straps for the handle. Fig. 3 represents the blank having the part for the handle-straps partly drawn out by the forging process. Fig. 4 represents a vertical section of the blank at line *y* of Fig. 3. Fig. 5 represents the blank after the handle-straps are drawn out by a forging or rolling process. Fig. 6 represents the blank after the shovel-blade and handle-straps are formed by a hammering or rolling process. Fig. 7 represents the blank after the shearing process. Fig. 8 represents the formed shovel-blade and handle-straps.

In the accompanying drawings, A represents the part of the blank which forms the shovel-blade, and D the part for forming the handle-straps. The blank shown in Fig. 1 may be cast of steel, or it may be cut from a bar of cast steel or iron of suitable width and thickness.

The blank is heated, and by means of a suitable punching device, or by other mechanism, the recess or cavity C is made in the part B, as shown in Fig. 2.

In the recess or cavity C are placed cinders, and the recess or cavity closed, as shown in Fig. 4. The blank is then ready for the hammer or rolls.

The part B for the handle-straps may be forged out, as shown in Fig. 5, and the part A "plated" by hammering or rolling; or the parts A and B may be hammered or rolled at one operation into the form shown in Fig. 6.

After the shovel blade and straps are hammered or rolled out, as shown in Fig. 6, the hammered or rolled blank is then subjected to the shearing process, which shearing gives the form shown in Fig. 7.

The blade A and straps B are formed, as shown in Fig. 8, in the usual way and by the ordinary means.

By forming the cavity C in the part B of the blank, the edges of the part which forms the handle-straps will remain united during the hammering or rolling process, thus keeping the straps parallel with each other in all their parts—that is to say, the straps will be held directly opposite to each other during the hammering or rolling process, the advantage of which will be apparent to the skillful shovel-maker.

Having thus described my improvement, what I claim as of my invention is—

In the manufacture of shovels, the herein-described improvement in the mode of forming the straps B, the same consisting in forming a rectangular blank with a recess in one end, as specified, and then drawing out the blank to form the straps by plating or hammering with the edges remaining united, and finally finishing and trimming, substantially as and for the purposes set forth.

HENRY M. MYERS.

Witnesses:
W. S. MOORE,
C. P. WALLACE.